July 14, 1925.
P. BASMAISON
EXPANSIVE BIT
Filed Aug. 1, 1922
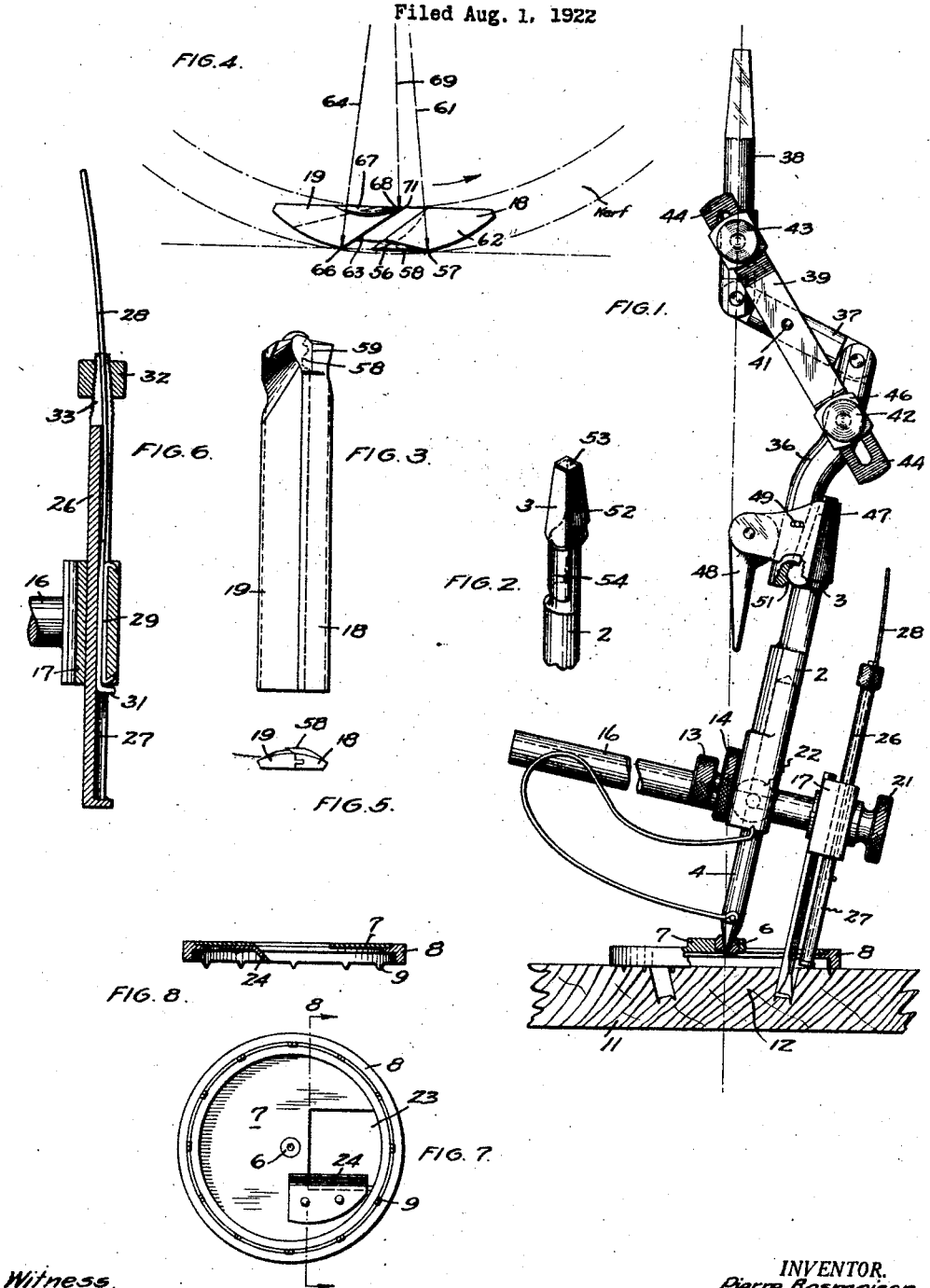
INVENTOR.
Pierre Basmaison.

Patented July 14, 1925.

1,545,632

UNITED STATES PATENT OFFICE.

PIERRE BASMAISON, OF SAN FRANCISCO, CALIFORNIA.

EXPANSIVE BIT.

Application filed August 1, 1922. Serial No. 578,921.

*To all whom it may concern:*

Be it known that I, PIERRE BASMAISON, a citizen of the United States of America, and a resident of the city and county of San Francisco, State of California, have invented a new and useful Expansive Bit, of which the following is a specification.

My invention relates to an expansive bit, and one capable of cutting tapered holes or plugs.

One of the objects of the invention is to provide an expansive bit in which improved means are provided for supporting the bit upon the work. Another object of the invention is the provision of a bit of the character described having an improved depth gauge. Another object of the invention is the provision of a bit provided with a cutter which leaves a smoothly finished surface, as it passes into the wood.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Referring to the drawings, Fig. 1 is an elevation of my tool complete, portions thereof being shown in section. The tool is shown with the cutter half way thru a board in which a tapered hole is being cut. Fig. 2 is a perspective of the end of the shank of the tool upon which the pad, which is a feature of my invention, is placed. Fig. 3 is a side elevation of the cutter. Fig. 4 is an end elevation on an enlarged scale of the cutter showing the cutting lips thereof. The dotted lines show the kerf formed by the cutter. Fig. 5 is an end view of the cutter showing the end opposite the cutting lip. Fig. 6 is a longitudinal sectional view thru the gauge rod. Fig. 7 is a bottom view of the support on which the shank of the tool rests. Fig. 8 is a sectional view, the plane of section being indicated by the line 8—8 of Fig. 7.

Broadly considered, my invention comprises a shank 2 having at one end a head 3 adapting it to be caught in the chuck of a brace and at the opposite end provided with a spring-pressed extension pin 4, for supporting the tool. The end of the extension pin is tapered and adapted to seat in a ball 6, mounted for universal movement in a disk 7, which in turn is mounted for rotary movement in a supporting ring 8, provided on its lower edge with points 9, adapted to engage firmly the wood 11 which is to be worked upon. The ring and plate structure supports the tool free of contact with the surface of the work, so that the plug 12 removed by the action of the cutter, as shown in Fig. 1, is unmarred by any aperture formed by the point of the extension pin. The universal mounting of the ball 6 permits the ready accommodation to any angular setting of the shank. A set screw 13 secured by lock nut 14, is provided to lock the pin 4, in the shank when it is desired to do so.

Transversely adjustable in the shank 2 is a cutter bar 16, terminating in a head 17, in which provision is made for locking the cutter, comprising parts 18 and 19, by means of the thumb screw 21. Thumb screw 22 is provided for securing the cutter bar in the adjusted position. Thus the cutter may be set at any desired distance from the shank within the limit of the length of the cutter bar so that either large or small diameter kerfs may be cut.

Provision is made for adjusting the cutter close to the shank so that the kerf lies within the supporting ring 8. This is done by providing a radial slot 23 in the plate 7 thru which the cutter projects. In order to prevent the accumulation of chips or shavings under the plate 7, a lip 24 is provided on the edge of the slot following the bit. This lip tends to direct the chips or shavings discharged from the cutter to the top of the plate where they may be readily brushed off.

Means are also provided for gauging the depth of the cut and such means also facilitates the proper holding of the tool. Slidably mounted in the cutter bar head 17 is a gauge rod 26 provided with a longitudinally disposed groove 27 in which a normally bent spline 28 is adapted to lie. A shoe 29, of similar cross section to the spline is interposed between the head and rod, the ends being bent over, as shown in Fig. 6, to prevent disengagement of the shoe. The body of the shoe lies within the groove in the rod, to prevent rotation thereof in the head. The resilience of the normally bent spline 28 provides sufficient thrust against the shoe 29 to frictionally retain the rod in any given position. One end of the spline is provided with a stop 31, and the spline is adjustable in the rod by means of a nut 32, threaded upon a tapered slit end 33 of the rod.

In beginning the cut the gauge rod is thrust downwardly so as to form immediate contact with the surface of the work. In the event that a small diameter kerf is to be made, the rod may extend thru the slot of the supporting plate, as shown in Fig. 1. As the cutter works into the wood the gauge rod is gradually pushed back until the stop 31 engages the head 17 thus preventing further entrance of the cutter into the work.

During the progress of this operation the workman is aided in keeping the rotation of the tool about a vertical axis by observation of the gauge rod, as it is obvious that any tipping of the axis of rotation out of the perpendicular will result in lifting the end of the gauge rod away from the surface of the work. By so holding the brace that the end of the gauge rod is always in contact with the surface of the work a true hole or plug, as the case may be, is assured.

When the head 3 of the shank 2 is mounted directly in the chuck of a brace, holes having edges perpendicular to the surface of the work may be cut, and since the production of the hole is also productive of a disk, disks of any particular size may be readily formed.

When it is desired to cut a tapered hole, or a tapered disk or plug, the shank is mounted in an offset extension, comprising a chuck member 36, connected by a link 37 to a shank 38. A tie bar 39 connected to the link 37 by the pin 41, is adjustably connected to members 36 and 38 by thumb screws 42 and 43 passing thru appropriate slots in the tie bar. In order to prevent slipping of the tie bar, the surface of the bar is provided with corrugations 44, engaging similar corrugations on the under side of a shoe 46, interposed between the thumb screw and the tie bar at each end. Thus the socket member 36 may be adjusted to any angle with the shank 38, and rigidly secured in desired position by the thumb screws. A clamp 47, operated by the cam lever 48, is provided for binding the shank 2 to the socket member 36. A pin 49 interposed between the clamp and the socket member 36 prevents disengagement of the clamp from the socket member, and a stud 51 formed on the socket member and adapted to engage under the head 3 of the shank prevents the shank from pulling out of the socket member when the clamp is applied, thus effecting a rigid connection between the two.

The mechanism just described enables the shank to be set at a decided angle, as shown in Fig. 1, to the axis of rotation of the tool as a whole, and such eccentricity may be varied as desired in accordance with the required taper of the plug or hole.

I have also provided means for giving the shank a slightly eccentric setting without the use of the device just explained, and which is sufficient where a slightly tapered plug is desired. This structure is shown in Fig. 2, and comprises a pad 52 having two sides adapted to engage on two sides of the head 3, and an end piece 53 to prevent the sliding of the pad downwardly on the head. The pad is held in position by an arm 54 which curves downwardly from one side of the pad and around the body of the shank under the head as shown so that accidental release of the pad and arm is prevented. The arm 54 also performs the additional function of padding the shank on the sides opposite the upper pad, thus supplementing the eccentric effect of the latter. The padded head is caught in the chuck of the brace, and is sufficient to offset the shank enough to give a slight taper to the hole or plug.

One of the chief objections to expansive bits has been the roughness of the cut usually made. My cutter leaves a perfectly smooth wall as it progresses into the work, and it comprises two pieces 18 and 19, tongue-and-grooved together for relative adjustment longitudinally. The leading piece 18 is provided with the outer lip or spur 56 of the cutter, the sharpened edge of which, beginning at the point 57, forms the outer wall of the kerf formed by the cutter. From the point 57 backwardly, the outer surface of the lip is flattened, such flattened surface 58 appearing as an area in Fig. 3, extending from the line 59 backwardly, and appearing as a line in Fig. 4. The proportions are such that the distance 61, from the center of rotation of the cutter to the point 57 is greater than to any other portion in the same horizontal plane, so that in operation, the cutter piece 18 bears against the outer wall of the kerf substantially along the line 59, which also passes thru the beginning of the entering edge of the lip 56. That is to say, the cutting lip begins to cut in a vertical line coinciding with the line of contact between the cutter and the outer wall of the kerf, the piece 18 curved sharply away from such outer wall ahead of the lip, and flattened away from such wall behind the lip. The end surface 62 of the piece 18 rides along the bottom of the kerf, being curved upwardly at its forward end in the fashion of a runner. The piece 19 of the cutter is provided with a horizontal cutting edge 63 lying across the cutter at an angle as shown to effect a slicing cut from the bottom of the kerf. The thickness of the shaving removed is determined by the vertical distance between the edge 63 and the surface 62 of the leading piece 18. In order to rout out the outer corner of the kerf sharply, the distance 64, from the center of rotation to the outer corner 66 of the cutting edge is substantially the same as the distance 61, no portion of the piece 19 extending beyond this point, and the rear of the piece 19 being curved sharply away from the outer wall of the kerf.

Above the cutting edge 63, the piece 19 is hollowed out to provide clearance space for the shavings to escape.

The piece 19 is also provided with the inner cutting lip 67 of the cutter which forms the inner wall of the kerf, and similar conditions surround the structure and operation of this lip, whose entering cutting edge begins at a point 68, the distance 69 of which from the center of rotation, is less than the distance to any other point on the cutter in the same horizontal plane, so that here too, the lip begins to cut in a vertical line coinciding with the line of contact between the cutter and the inner wall of the kerf, the leading end 71 of the horizontal cutting edge 63 terminating substantially in the same line so that the inner corner of the kerf is cut sharply.

The structure of the cutter just explained permits perfectly smooth holes or plugs to be cut, with no tendency of the cutter to "hog in" or "run" with the grain.

I claim:

1. An expansive bit comprising a shank, a cutter adjustably supported on said shank, a detached disk having a slot in which the cutter may be radially adjusted, centering means for the shank on said disk, and means for rotatably supporting the disk from the work.

2. An expansive bit comprising a shank, a cutter adjustably supported on said shank, a disk having a slot in which the cutter may be radially adjusted, centering means for the shank on said disk, means for rotatably supporting the disk, and a lip depending from the edge of said slot in the rear of the cutter to facilitate the discharge of the chips.

3. An expansive bit comprising a shank, a cutter adjustably supported on said shank, a disk having a slot in which the cutter may be radially adjusted, centering means for the shank on said plate comprising a radially apertured ball mounted for universal movement, a ring for rotatably supporting the disk, and means on the ring for preventing its lateral displacement on the work.

4. A tool for cutting tapered plugs or holes comprising a shank having an end formed for connection with an operating chuck, a cutter adjustably supported on said shank, a pad interposable between one side of the shank and said chuck for effecting an eccentricity of movement in the shank corresponding to the degree of taper desired in the plug or hole, and a curved arm on said pad releasably engageable with said shank for holding the pad in place.

5. A bit comprising a shank, a cutter bar transversely adjustable on said shank, a cutter arranged on said bar, a gauge rod slidably mounted in said bar parallel to said cutter, means for resiliently holding said gauge rod in place, and a positive stop for limiting the movement of said gauge rod.

6. A depth gauge for a bit comprising a longitudinally grooved gauge rod, means for mounting the rod on the bit, a normally curved spline lying in said groove and adapted to exert resilient pressure between said rod and its mounting means, a stop on said spline, and means for adjustably securing said spline in said groove to vary the distance between the stop and the end of the rod.

In testimony whereof, I have hereunto set my hand.

PIERRE BASMAISON.